United States Patent Office 3,533,848
Patented Oct. 13, 1970

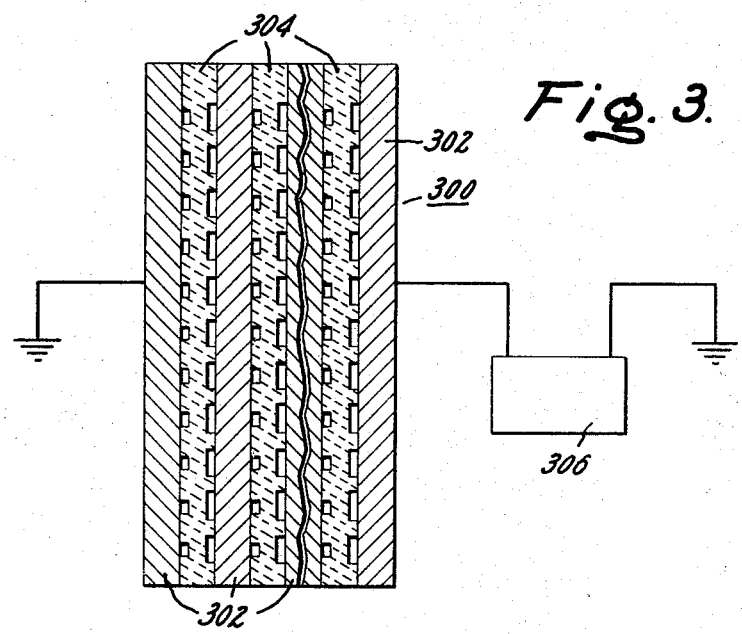
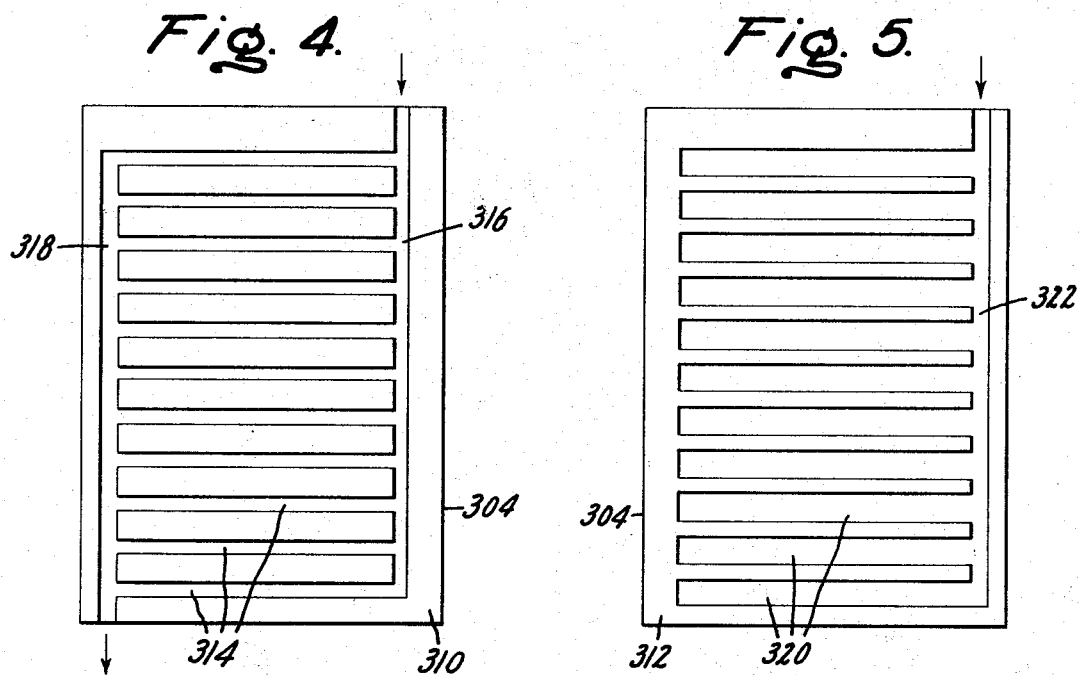

3,533,848
SODIUM-SULFUR FUEL CELL UNITS
Oliver H. Winn, Glens Falls, N.Y., assignor to General
Electric Company, a corporation of New York
Filed Apr. 20, 1967, Ser. No. 632,339
Int. Cl. H01m 27/00, 35/00
U.S. Cl. 136—86                                  11 Claims

ABSTRACT OF THE DISCLOSURE

A fuel cell system is disclosed including a fuel cell unit utilizing a sodium ion permeable electrolyte element as a fluid barrier. Molten sodium is supplied to one face of the barrier while molten sulfur is supplied to the opposite face. The bulk of both the sodium and sulfur are stored externally of the fuel cell unit and transported thereto for consumption. The sodium sulfide leaving the fuel cell unit may be indirectly heat exchanged with either of the incoming reactants. The fuel cell unit is preferably constructed with a current collector cooperating with one face of the electrolyte means so that a shallow sulfur flow passage is formed therebetween.

---

Figure 1:
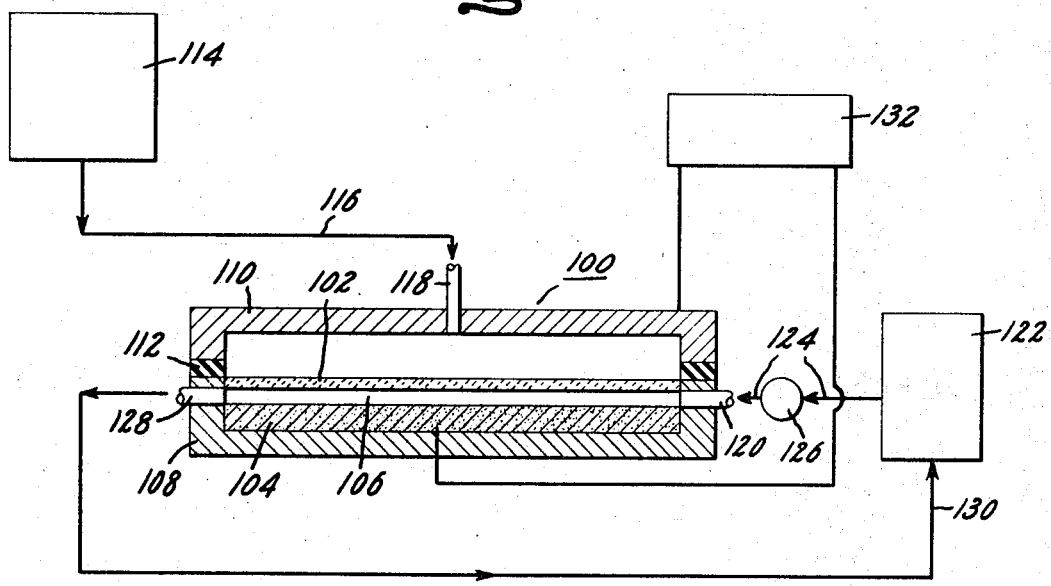

My invention relates to novel sodium-sulfur fuel cell units as well as systems including such units.

Prior to my invention rechargeable sodium-sulfur cells have been known to the art. These cells utilize sodium both as one reactant and as an electrode. Sulfur is utilized as the cathode reactant in combination with an inert current collector. The reactants are prevented from mixing directly by the use of an electrolyte element as a barrier. The electrolyte element is preferably formed of a sodium ion permeable material such as beta-alumina. Since it is necessary that the reactants be maintained in the liquid phase, operating temperatures of from 110 to 1000° C. are contemplated, although reaction temperatures are preferably maintained around 350° C., plus or minus 100° C.

In considering the practical application of such cells to use in providing electrical power for non-laboratory uses, a number of disadvantages are immediately apparent. First of all, rechargeable cells of the type previously known to the art have incorporated all or most of the available sulfur and sodium within the cell. This poses a safety hazard, since the relatively thin electrolyte barrier is then solely relied upon to prevent the instantaneous mixing of the molten sulfur and sodium. Should the electrolyte element fail as a barrier, a hazard might be created. Merely decreasing the total amount of sulfur and sodium present in the cell does not avoid the problem, since this also reduces the amount of power obtainable from the cell between chargings. It can be readily appreciated that while a small cell is much less of a safety hazard than a large cell, it is also much more limited as an electrical power source. With conventional construction of sodium-sulfur cells another disadvantage is that attempts to increase the amount of electrical energy that can be withdrawn between chargings requires a general scale-up of the cell construction. Thus, the increase in the energy capacity of the cell is accomplished by an increase in cost and size which is undesirable as well as a power capacity increase which may be unneeded.

It is an object of my invention to provide a fuel cell unit which avoids the disadvantages of sodium-sulfur cell constructions heretofore known to the art.

It is a more specific object to provide a sodium-sulfur fuel cell system which is capable of providing high energy capacity without creating a safety hazard, which is capable of increasing energy capacity without producing an increase in cost and size of the cell, and which is capable of improving energy capacity while improving the energy to weight ratio of the system.

These and other objects of my invention are accomplished by providing a fuel cell system for the electrochemical combination of sodium and sulfur to generate electrical energy comprising a fuel cell unit including a sodium permeable electrolyte means having first and second faces, a means for confining molten sodium adjacent the first face, and a means for confining molten sulfur adjacent the second face. A means is provided for defining a sodium storage zone exterior of the fuel cell unit, and means are provided for delivering molten sodium from the sodium storage zone to the sodium confining means. Means are provided defining a sulfur storage zone exterior of the fuel cell unit, and means are provided for delivering molten sulfur from the sulfur storage zone to the sulfur confining means.

Figure 2:
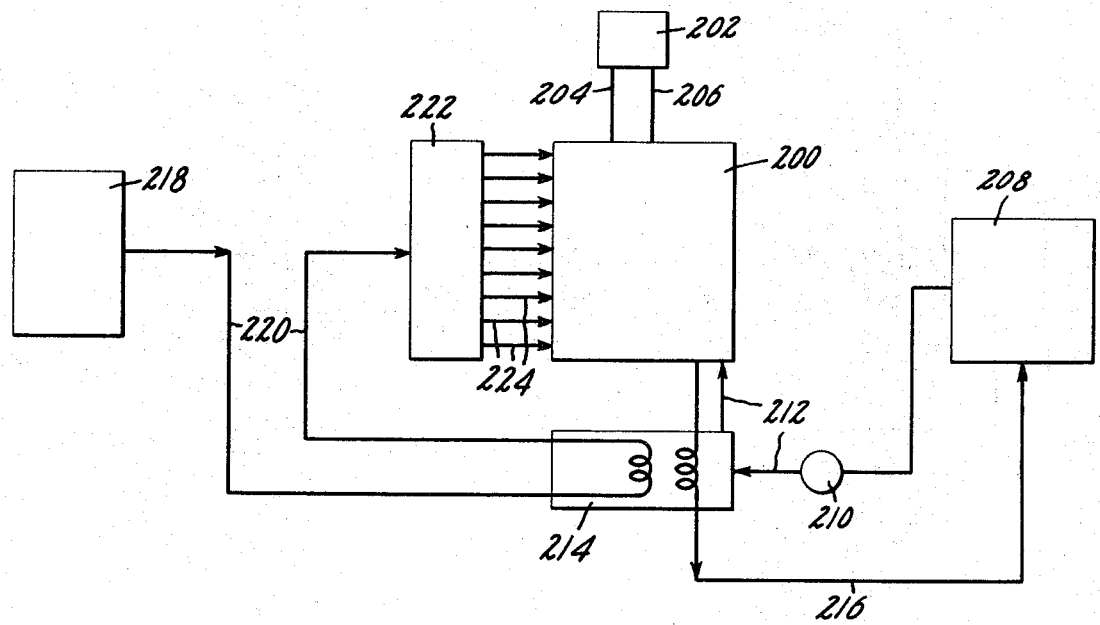

My invention may be better understood with reference to the following detailed description considered in conjunction with the drawings, in which FIG. 1 is a vertical section of a fuel cell unit constructed according to my invention having other system elements schematically shown, FIG. 2 is a schematic view of another fuel cell system, FIG. 3 is a vertical section of a fuel battery also schematically illustrating an electrical load, and FIGS. 4 and 5 are vertical elevations of opposite faces of an electrolyte element constructed according to my invention.

Noting FIG. 1, a fuel cell unit 100 is illustrated which is comprised of an electrolyte element 102. The electrolyte element is a sodium ion permeable barrier of a type compatible with molten sodium and molten sulfur, such as beta-alumina. A current collector 104 is narrowly spaced from the electrolyte element to form a shallow fluid passage 106 therebetween. The current collector may be formed of any electrically conductive material known to be chemically inert toward molten sulfur and molten sodium sulfide. As used herein the term "sodium sulfide" includes compounds of sodium and sulfur ranging from sodium pentasulfide to disodium sulfide. Graphite is a specific preferred current collector material. As shown, the electrolyte element and the current collector are mounted in desired relationship by a lower housing portion 108. An upper housing portion 110 is positioned above the electrolyte element electrically insulated from the lower housing portion by gasket 112. The upper housing portion confines molten sodium.

The molten sodium is supplied to the fuel cell unit from a sodium storage zone schematically shown at 114. The molten sodium is delivered to the upper housing portion as indicated by flow arrows 116 and sodium inlet conduit 118.

Liquid sulfur is supplied to the lower housing portion through sulfur inlet conduit 120. The molten sulfur is delivered from sulfur storage zone 122 as indicated schematically by flow arrows 124. A pump means 126 is shown for circulating the molten sulfur. The lower housing is provided with a reaction product outlet conduit 128. Although not an essential feature of my invention, it is in most cases desirable to return the reaction product from the fuel cell unit to the sulfur storage zone, as indicated by flow arrows 130.

To obtain electrical energy from the system an electrical load 132 is illustrated connected between the upper housing portion and the current collector.

The system shown may be operated by bringing the fuel cell unit 100 up to a desired operating temperature between 110 and 1000° C., preferably around 350° C., as previously noted. The sodium and sulfur storage zones 114 and 122, may in one form of the invention be heated up to or near the desired operating temperature, so that both the sodium and sulfur are molten and easily transported. Molten sodium is fed into the upper housing portion through the sodium inlet conduit 116. Sodium may be pumped to the cell, in which case it may be desirable to provide a return passage from the cell to the sodium storage zone, or sodium may be allowed to enter the cell merely by gravity feed. At the same time as sodium is supplied, sulfur is delivered to the cell through pump means 126 and sulfur inlet conduit 120.

When the electrical load 132 is connected between the upper housing portion 110 and the current collector 104 as illustrated, sodium atoms will react at the surface of the electrolyte means 102 to form sodium ions. This will release free electrons to the molten sodium and to the upper housing portion from which they may be conducted in the circuit leading to the electrical load. The sodium ions produced are themselves caused to migrate through the electrolyte means. Adjacent the lower face of the electrolyte means the sodium ions react with molten sulfur to produce sodium sulfide. This reaction requires additional electrons. These are supplied from the external electrical circuit connected to the electrical load by the current collector.

Whereas liquid sodium is a good electronic conductor, molten sulfur is a poor one. Accordingly, if the fuel cell unit were constructed with a large gap between the electrolyte element and the current collector, it would be expected that a large polarization would occur across the cell upon any attempt to draw appreciable amounts of electrical current. With my construction, however, the current collector is mounted closely adjacent the electrolyte element so as to minimize internal resistance attributable to the conductive properties of the molten sulfur.

It is further noted that the energy capacity of my system is independent of the size of the fuel cell unit. Rather, the capacity of the sodium and sulfur storage zones are controlling of the energy obtainable from the system. Accordingly, the fuel cell unit may be sized to meet the desired peak power output level rather than to meet the total energy output desired per cycle, as is required with conventional rechargeable sodium-sulfur cells previously disclosed. It is then apparent that the fuel cell unit may be sized quite small in comparison to the total energy output expected. In this circumstance the considerable safety hazard of having large volumes of sodium and sulfur in juxtaposition across a thin electrolyte barrier, characteristic of known rechargeable sodium-sulfur cells, can be obviated.

While it is not essential that the system illustrated be operated regeneratively, this can be done if desired. To accomplish this the electrical load 132 is merely replaced by a source of D-C power. Instead of sodium being consumed in the upper housing portion, it will be produced by consuming the sodium sulfide contained in the sodium located in the lower housing portion. By continuously circulating the molten sulfur between the sulfur storage zone and the fuel cell unit, all of the sodium originally consumed can be regenerated. At the same time the sulfur will also be regenerated. Accordingly, by electrical charging the system can be restored to its initial condition. That is, ready to again supply electrical energy upon having an electrical load connected across the fuel cell unit.

For most applications it will be desirable to provide the system with more sulfur than sodium. In such instance the system will be limited in total electrical energy output by the available sodium. Having an excess of sulfur offers the advantage that the contamination of sulfur with sodium sulfide, the reaction product, during operation will not significantly affect the maximum power outputs obtainable. It is recognized that in many applications it may be desirable to separate the sodium sulfide from the sulfur. According to one technique this can be done by allowing the sodium sulfide and molten sodium to separate into two separate liquid phases in the sulfur storage zone. By then pumping from the sulfur phase, entrainment of sodium sulfide can be minimized. It is also contemplated that sodium sulfide and sulfur can be pumped through a plurality of fuel cell units in a series flow arrangement so that the output from the final cell in series contains a very high proportion of sodium sulfide, which can then be stored for regeneration or rejected from the system.

FIG. 2 illustrates another fuel cell system particularly suited for use with a fuel cell unit comprised of a plurality of electrically related fuel cells—that is, a fuel battery. As shown, a fuel battery 200 is schematcially illustrated electrically connected across electrical load 202 by electrical leads 204 and 206. Sulfur is pumped to the fuel battery from sulfur storage zone 208 by pump means 210 as indicated by flow arrows 212. Enroute the sulfur flows through indirect heat exchanger 214. Sodium sulfide or a mixture of sulfur and sodium sulfide may be removed from the fuel battery and returned to the sulfur storage zone as indicated by flow arrows 216. It is noted that the heat stored in the effluent from the fuel battery may be transferred to the incoming sulfur and sodium within the indirect heat exchanger.

Sodium is supplied to the fuel battery from the sodium storage zone 218. As indicated by flow arrows 220, the sodium is circulated via the heat exchanger to an electronic decoupler 222. The function of the electronic decoupler is to prevent shunt currents being transmitted through the sodium between the series related cells of the fuel battery. If the fuel battery were constructed with the cells connected electrically in parallel, an electronic decoupler would not be required. In one form the electronic decoupler may simple be a pump which breaks up the sodium into separate streams corresponding in number to the number of cells in the fuel battery. In a practical form this may be comprises of a pump having a plurality of separate impellers run from a common drive and connected to a common inlet. In a simpler version of an electronic decoupler the flow streams leading to the separate cells may be made so long and tortuous that too high a resistance is provided by the flow paths for any appreciable shunt currents to flow. In still another form of an electronic decoupler, sodium may be allowed to drip from a common inlet into separate receivers leading to the fuel battery. The drop-wise addition of sodium of course breaks the continuity of the flow path and prevents electrical conduction. The flow arrows 224 schematically represent the separate flow paths into each of the separate cells of the fuel battery.

FIG. 3 illustrates a specific fuel battery construction 300 formed according to my invention. The fuel battery offers both efficiency and simplicity, being constructed entirely of current collectors 302 and electrolyte elements 304. These elements may be formed of materials of the type discussed above with reference to FIG. 1. An electrical load 306 is schematically shown electrically connected to ground and to an end-most of the current collectors. The remaining end-most current collector is also grounded so that it can be seen that the cells of the fuel battery are electrically connected in series.

The electrolyte elements are each formed with a first major face 310 illustrated in FIG. 4 and a second major face 312 illustrated in FIG. 5. The face 310 is provided with a plurality of parallel grooves 314 communicating at one end with an inlet groove 316 and at a remaining end with an outlet groove 318. This groove pattern is intended to form shallow flow passages for the circulation of sulfur to each cell of the battery and the exhaust of sodium sulfide. The passages are formed by the grooves cooperating with the adjacent face of the current collector.

The face 312 of the electrolyte elements are each formed with a plurality of parallel grooves 320. These grooves each connect at one end to a plenum inlet groove 322. It is intended that this face of the electrolyte element when cooperating with the opposite faces of the current collectors form shallow fluid passages for the introduction of sodium into the cells of the fuel battery.

While the grooves are shown formed in the electrolyte elements only, it is appreciated that the grooves could as well be formed in both the electrolyte elements and the current collectors or in only the current collectors. Further while it is preferred that the grooves be formed on both the sodium and sulfur sides of the cells, it is not essenial that this be done. It is greatly preferred, however, that the sulfur side of the cells be grooved as disclosed, since this provides a good electrical flow path from the electrolyte means to the current collectors. Hence internal polarization of the cells is minimized. The additional provision of grooves on the sodium sides of the cells is not so much for the purpose of preventing polarization (although this is one benefit) since sodium has a high electrical conductivity. Rather, the grooves serve the primary purpose of better control of the reactants should a rupture occur in an electrolyte element allowing gross mixing of reactants.

It is anticipated that other techniques may be resorted to for improving the electronic conductivity of the cell through the sulfur reactant, if desired. For example, it may be desirable to disperse finely divided or colloidal particles of carbon or other chemically inert, electronically conductive material in the sulfur to further improve electronic conductivity. Alternately, it may be desirable to provide a porous material in the sulfur confining grooves to still further improve electronic conductivity. An open porous foam or porous form of carbon may be effectively used for this purpose. It is considered, however, that the provision of shallow grooves will alone be sufficient and the use of additional electronic conductors is not deemed essential or in most instances desirable.

This invention is applicable to fuel cells utilizing a number of electrolyte materials other than beta alumina, and a number of reactants other than sodium and sulfur. The combination of the noted sulfur and sodium reactants, together with beta alumina as the electrolyte, being one exemplary embodiment of the invention. Furthermore, the reactants may be stored and supplied to the cell unit in various forms other than molten, for example, in powder or particulate form.

When the system as disclosed is utilized as the power plant of an automotive type vehicle, particularly passenger vehicles, provision is made to add sodium at periodic intervals and to add and withdraw sulfur from the system. Such provision may be in the form of a suitable repetitively openable closure in the storage zone through which sodium is added to the system or by means of removable tank type supplies of sodium. The closure and or tank system may be employed to add sulfur to and withdraw sodium sulfur mixture from the system.

While I have disclosed my invention with reference to certain preferred embodiments, it is recognized that numerous variations will readily occur to those skilled in the art. It is accordingly intended that the scope of my invention be determined with reference to the following claims.

What I claim and desire to secure by Letters Patent of the United States is:

1. A fuel cell unit for the electrochemical combination of sodium and sulfur to generate electrical power comprising
   sodium ion permeable electrolyte means forming a fluid barrier and having first and second opposed faces,
   means for delivering sodium from an external storage zone and for confining the sodium in molten form adjacent said first face of said electrolyte means, and
   current collector means chemically inert toward molten sulfur and sodium sulfide mounted adjacent said second face of said electrolyte means and cooperating therewith to form at least one shallow flow passage within which sulfur and sodium sulfides may be circulated, said flow passage being defined by sodium ion permeable electrolyte means and said current collector means and
   means for supplying molten sulfur to the flow passage and for removing molten sodium sulfide therefrom.

2. A fuel cell system for the electrochemical combination of sodium and sulfur to generate electrical power comprising
   a fuel cell unit including
       sodium ion permeable electrolyte means having first and second opposed faces,
       means for confining molten sodium adjacent said first face, and
       means for confining molten sulfur adjacent said second face, and
       current collector means chemically inert toward molten sulfur and sodium sulfide mounted adjacent said second face of said electrolyte means and cooperating therewith to form at least one shallow flow passage within which sulfur and sodium sulfides may be circulated, said flow passage being defined by sodium ion permeable electrolyte means and said current collector means, and
   means defining a sodium storage zone exterior of said fuel cell unit,
   means for delivering sodium from said sodium storage zone to said sodium confining means,
   means defining a sulfur storage zone exterior of said fuel cell unit, and
   means for delivering sulfur from said sulfur storage zone to said sulfur confining means.

3. A fuel cell unit as defined by claim 1 in which said current collector means and said electrolyte means cooperate to form a plurality of juxtaposed, parallel flow passages.

4. A fuel cell unit as defined by claim 3 in which said current collector means and said electrolyte means cooperate to form interconnected flow passages.

5. A fuel cell system as defined by claim 2 in which said fuel cell unit is comprised of a plurality of fuel cells and said sodium delivering means including means for electronically decoupling the sodium supplied to each of said fuel cells from the sodium supplied to the remaining of said fuel cells.

6. A fuel cell system as defined by claim 2 additionally including means for circulating sodium sulfide from said fuel cell unit to said sulfur storage zone.

7. A fuel cell system as defined by claim 6 in which said means defining a sulfur storage zone is maintained at an elevated temperature whereby the sulfur and the sodium sulfide form two separate liquid phases and said sulfur delivering means communicates with said sulfur phase.

8. A fuel cell system as defined by claim 6 additionally including indirect heat exchange means for transferring heat from the sodium sulfide leaving said fuel cell unit to at least one of the reactants entering said fuel cell unit.

9. A fuel cell system as defined by claim 5 in which said fuel cells are electrically connected in series.

10. A sodium-sulfur fuel battery comprising
    a plurality of sodium ion permeable electrolyte means each forming a fluid barrier and each having first and second opposed faces,
    a plurality of fluid impervious current collector interposed between adjacent of said electrolyte means and each having a third face cooperating with said first face of one of said electrolyte means and a fourth face cooperating with said second face of an adjacent of said electrolyte means, at least one of each of said cooperating first and third faces being grooved whereby said current collectors and said electrolyte means cooperate to form first fluid passages, means for delivering molten sulfur to said fuel battery through said first fluid passages, and means for delivering molten sodium to said fuel battery between said opposed second and fourth faces of each of said electrolyte means and said current collectors.

11. The invention as recited in claim 5 in which electrical connection means are employed to connect said cells together in a predetermined manner and flow control means are utilized to selectively energize said cells in a predetermined manner.

References Cited

UNITED STATES PATENTS

| | | | |
|---|---|---|---|
| 2,102,701 | 12/1937 | Gyuris | 136—83 |
| 1,843,698 | 2/1932 | Ruben | 136—83 |
| 2,301,021 | 11/1942 | Dalpayrat | 136—83 |
| 3,099,587 | 7/1963 | Chambers et al. | 136—86 |
| 3,245,836 | 4/1966 | Agruss | 136—86 |
| 3,404,035 | 10/1968 | Kummer et al. | 136—6 |
| 3,404,036 | 10/1968 | Kummer et al. | 136—6 |

WINSTON A. DOUGLAS, Primary Examiner

A. SKAPARS, Assistant Examiner

U.S. Cl. X.R.

136—6, 83